April 8, 1958 — W. O. H. KROLL — 2,829,735
MECHANICAL FILTERS FOR SEPARATING DUST FROM GAS
Filed June 27, 1956 — 5 Sheets-Sheet 1

INVENTOR.
Werner Otto Harald Kroll

FIG.7

April 8, 1958 W. O. H. KROLL 2,829,735
MECHANICAL FILTERS FOR SEPARATING DUST FROM GAS
Filed June 27, 1956 5 Sheets-Sheet 4

INVENTOR.
Werner Otto Harald Kroll

April 8, 1958 W. O. H. KROLL 2,829,735
MECHANICAL FILTERS FOR SEPARATING DUST FROM GAS
Filed June 27, 1956 5 Sheets-Sheet 5

INVENTOR.

Werner Otto Harald Kroll

United States Patent Office 2,829,735
Patented Apr. 8, 1958

2,829,735

MECHANICAL FILTERS FOR SEPARATING DUST FROM GAS

Werner Otto Harald Kroll, Koln-Dellbruck, Germany, assignor to Klöckner-Humboldt-Deutz Aktiengesellschaft, Koln-Deutz, Germany, a corporation of Germany Application June 27, 1956, Serial No. 594,312

Claims priority, application Germany June 30, 1955

18 Claims. (Cl. 183—58)

My invention relates to filters for separating dust from gas. This application is a continuation-in-part of my copending application Serial No. 578,824, filed April 17, 1956.

It is the main object of the invention to provide a filter which is insensitive to high temperatures of the dust-laden gas and combines high separating efficiency with a simple filter construction while readily permitting the filter to be cleaned without any interruption in filtering operation.

To this end, and in accordance with a feature of my invention, I provide a conduit or housing structure, which forms a substantially horizontal channel, with an inlet for dust-laden gas at one end and an outlet for cleaned gas at the other end; and I dispose within the channel a multiplicity of arrays of filter wires each comprising a large number of individual wires distributed over the cross section of the channel in mutually spaced relation, the respective arrays being spaced from each other between the inlet and outlet of the channel. I further provide these arrays of filter wires with a shaker mechanism, for instance a vibrator or a striker, for releasing the accumulation of dust from the filter wires; and I provide the conduit structure with a chamber that extends beneath all arrays of wires and has a bottom outlet for discharging the collected deposits. In order to force the dust-laden gas to pass through the arrays of wires, a number of insert structures, preferably designed as sheet metal partitions, are mounted in the chamber.

According to another feature of my invention, each of the above-mentioned channels is provided with a flap-valve or other closure means so as to permit opening and closing the inlet or outlet of each channel.

According to further features of the invention, two or more filter units, each equipped with arrays of filter wires and designed as described above, are arranged in parallel flow relation and are all connected between a common gas inlet conduit and a common clean-gas outlet conduit, each unit having a gate valve to be temporarily closed to the flow of gas for vibrating or shaking the dust accumulations from the filter wires and removing them from the filter housing while the other filter unit or units remain in operation.

The invention is based upon the consideration that when a body is impinged upon by dust-laden gas, the dust particles have the tendency to precipitate upon the surface of the body facing the gas stream. This phenomenon occurs increasingly with an increase in the velocity of the gas flow. This can be explained by the fact that at high gas velocities the inertia of the dust particles relative to a change in direction is so large that the gas is no longer capable to entrain the dust particles around the obstacle body. Consequently, when the gas velocity is made sufficiently great, it can be achieved that even very fine dust particles are precipitated upon the obstacle. The term $$\frac{V_s \cdot V}{G \cdot D}$$

can be considered as a quality factor for the degree of dust separation. In this term, $V_s$ denotes the sinking velocity of a dust particle in stagnant air, $V$ the gas velocity, $G$ the gravity acceleration, and $D$ the diameter of the obstacle body.

Since during operation of each filter channel according to the invention, the dust-laden gas is forced to pass through the gaps between the individual filter wires, each individual wire represents an obstacle body located within the gas stream. If the gas velocity is made sufficiently high and if a sufficient number of filter wires are provided, virtually all of the dust can be made to precipitate upon the wires. The cleaning of the wires from the adhering dust precipitation is effected during operation of the filter by periodically jarring the filter wires. The precipitated dust is then released from the wires in the form of pieces. The coarser pieces, which represent the by far largest proportion of the separated dust, drop downwardly into the collecting chamber of the filter conduit or housing structure from which the dust is continuously or periodically discharged.

In one of the preferred embodiments of the invention, another dust separator, preferably of the centrifugal type such as a cyclone, is connected to the clean-gas outlet of the filter to eliminate any residual fine pieces of dust that may issue from the filter together with the cleaned gas.

The foregoing and other objects, advantages and features of the invention will be apparent from the embodiments of filters according to the invenion illustrated by way of example on the drawing and described in the following:

Figures 1, 2:
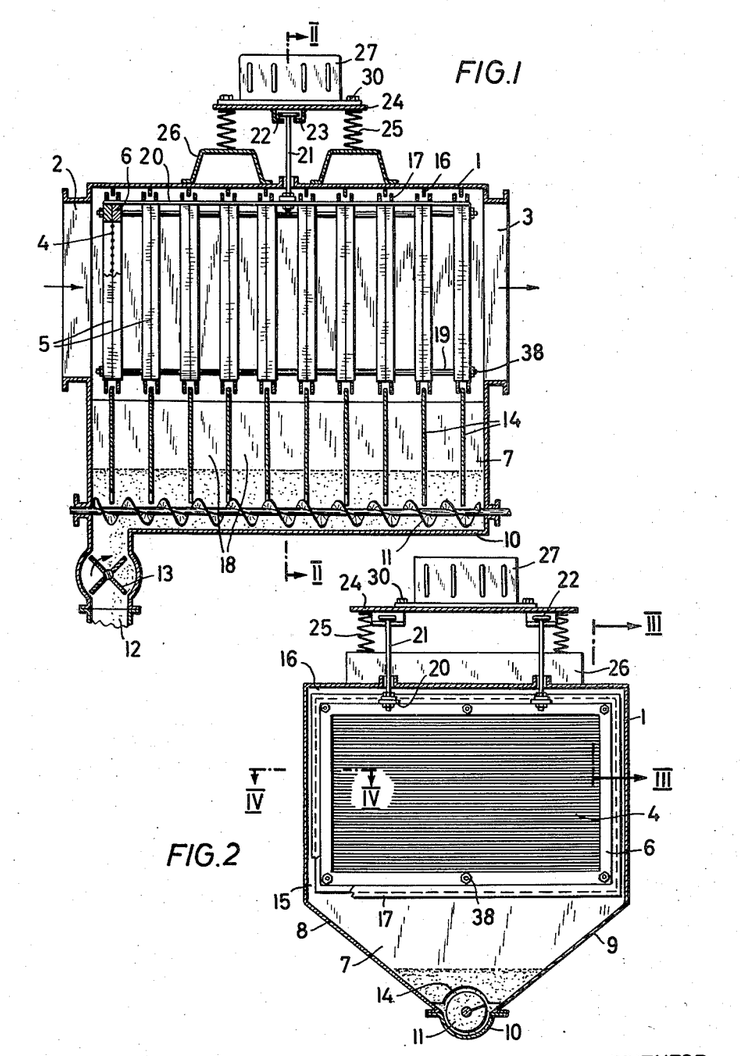
Fig. 1 shows a filter in central longitudinal section.
Fig. 2 is a cross section along the line II—II in Fig. 1.

The filter according to Figs. 1 to 6 has a box-shaped sheet metal housing structure 1 of rectangular cross section which forms a horizontal conduit or channel. At the left side (Fig. 1), the channel structure has an inlet portion 2 for the supply of hot dust-laden gas. At the right-hand side, the channel is provided with an outlet portion 3 for discharging the cleaned gas. A large number of filter wires 4 are arranged within the channel and, preferably, extend all in the horizontal direction. They are uniformly spaced from each other and uniformly distributed over the cross section of the channel. Several arrays of such wires are mounted in respective vertical planes 5 which are likewise spaced from each other. Ten such planes are illustrated in Fig. 1. Generally, however, this is not sufficient, it being usually preferable to provide about 20 to 60 or more such arrays or planes. Instead of being in vertical planes the arrays of wires may also be given various other arrangements, for instance so that each array forms a curved geometric surface.

Figures 3, 4, 5:
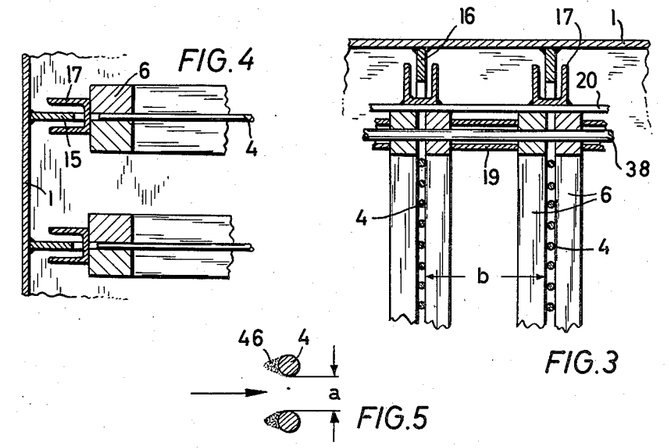
Fig. 3 is a partial and sectional view on a larger scale along the line III—III in Fig. 2.
Fig. 4 shows on larger scale a detail in section taken along the line IV—IV in Fig. 2.
Fig. 5 shows two filter wires of the same device on enlarged scale and in cross section.

As shown in Fig. 5 the wires 4 may have circular cross section. Their diameter is within the range of approximately 0.5 to 20 mm. and is preferably made larger with an increasing grain size of the dust to be separated. The spacing $a$ between each two adjacent wires is preferably 1 to 3 times the wire diameter, and the spacing $b$ (Fig. 3) between two adjacent planes or arrays is preferably about 5 cm. At the location of the arrays of wires the channel structure 1 is downwardly enlarged to form a chamber 7 of downwardly tapering shape (Figs. 1, 2). The longitudinal walls 8 and 9 of chamber 7 are joined at their respective bottom portions with a trough 10. Disposed in the trough is a conveyor screw 11 whose axis is parallel to the trough and which is provided with a suitable drive (not illustrated). The screw 11 conveys the collected dust material toward the left into a pipe 12 through a rotating cell wheel 13.

The wires of each individual array are preferably mounted in a two-part frame structure 6. As apparent from Fig. 2, each frame structure extends, with only slight clearance, up to the ceiling and laterally to the vertical walls of the channel structure 1. The chamber 7 is subdivided by a number of partitions 14 of sheet metal located in the respective geometric planes of the arrays of wires. The partitions 14 extend downwardly close to the conveyor screw 11, leaving only slight clearance, and they also extend upwardly to the frame structure 6 with only slight clearance. In the same respective planes, the lateral walls and the ceiling of the channel 1 are provided with projecting ledges 15 and 16 (Figs. 1, 3, 4). Mounted around the periphery of each frame structure 6 is a rail 17 of U-shaped cross section (Figs. 1, 3, 4). The two limbs of the rails 17 form a labyrinth seal together with the upper edges of the partitions 14 and together with the ledges 15 and 16. In this manner, a seal preventing the passage of gas is formed between the individual compartments 18 (Fig. 1), these seals being effective between each individual partition 14 and the lateral walls and ceiling of the channel on the one hand and between each partition and the wire frame 6 on the other hand.

The respective frame structures 6 are firmly joined together by means of bolts 38 and spacer tubes 19 mounted on the bolts (Fig. 3). Thus all frames form together a single sub-assembly. Two horizontal rails 20 are fastened to this assembly and are joined with respective vertical rods 21 (Figs. 1, 2) in the center of the assembly. Each rod 21 has a disc 22 fixed to its top. The disc 22 is loosely seated upon two angle irons 23 which are secured to a plate 24 (Figs. 1, 2). The plate 24 rests upon four helical compression springs 25 which are supported upon transverse projections 26 on top of the channel structure 1. The supporting springs 25 are so dimensioned that the assembly of wire frames is held freely suspended within the channel space.

Figure 6:
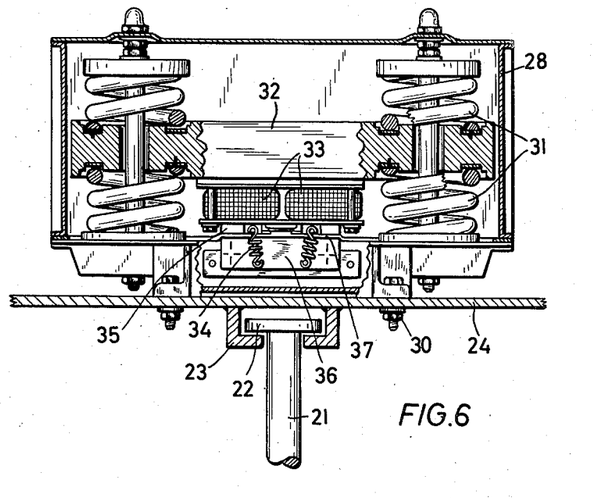
Fig. 6 illustrates, partially in section, a shaker also forming part of the same device.

A vibrator 27 is mounted on top of plate 24 by means of fastening screws 30. As shown in Fig. 6, the vibrator comprises a housing 28 in which an iron bridge 32 is mounted between two pairs of springs 31. The bridge 31 carries two magnet coils 33 with appertaining current supply springs 34, as well as two magnet cores which terminate with slight clearance in front of an iron armature 36 so as to form an air gap 37 together therewith. When energizing the vibrator according to Fig. 6 by alternating current, the iron bridge 32 is placed into vertical oscillation. The oscillations are transmitted through the springs 31 to the housing 28 and plate 24 and thence through rods 21 to the wire-screen assembly.

Figure 7:
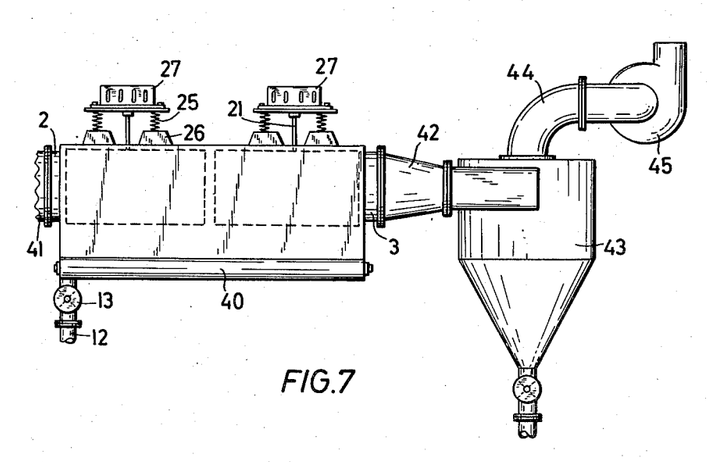
Fig. 7 illustrates a complete filter plant.

The performance of the filter will be described presently with reference to the filter plant illustrated in Fig. 7. This plant is equipped with a filter device 40 which comprises two of the above-described filter units each having, for instance, ten wire frames and each having a vibrator 27. The filter device 40 is joined by means of the inlet portion 2 with a pipe 41. The gas outlet portion 3 is joined through a conduit 42 with the inlet of a cyclone 43. The pure-gas outlet 44 of the cyclone is connected to the suction side of a blower 45 whose pressure outlet opens into the ambient air.

At first only the blower 45 is put in operation so that hot, dust-laden air is inducted into the filter 40 from pipe 41. Because of the labyrinth seals effective between the wire frames 6 and partitions 14 on the one hand, and the channel structure 1 and chamber walls 7, 8 on the other hand, the gas is forced to pass through the gaps between the individual filter wires. With a sufficiently high velocity of the gas flow passing through the filter, the entrained dust precipitates onto the left side of the wires impinged upon by the gas and, as shown in Fig. 5, forms a deposit 46 in which the individual particles firmly adhere to each other. The gas thus cleaned passes through components 42, 43, 44 and 45 (Fig. 7) into the ambient air.

It is apparent from Fig. 5 that despite the deposition of dust, the gaps between the individual wires remain fully open. Thus, the gas is not appreciably impeded in its passage through the wire screens during long continuous periods of operation. As a result, the resistance of the filter channel to the passage of the gas is always substantially constant and does not increase by the accumulation of dust as is the case in other filters. As explained in the foregoing, the velocity with which the gas is forced against the filter wires depends upon the grain size of the dust and is made larger for finer grain sizes. Generally a gas velocity of about 3 to about 8 meters per second is suitable. It is preferable to give the filter wires a smaller diameter with decreasing grain size of the dust. For instance, if the dust has an average grain size of 3 microns, a very good dust separation is obtained when the velocity of the gas is 7 meters per second; and it is preferable in this case to provide filter wires of approximately 3 mm. diameter.

Fig. 5 shows the condition at which the deposition of dust 46 on the wires has increased to such an extent that a further increase would commence to impair the dust separating performance. When this condition is reached, the vibrators are operated for a short interval of time. They have the effect of imparting oscillations to the assemblies of wires and thus also to the individual wires 4. The oscillation frequency, when operating the vibrators with the usual alternating current of 50 or 60 cycles per second, is 6000 or 7200 per minute. The oscillating amplitude of the assemblies is slight and amounts, for instance, to approximately 0.5 mm. The illustrated suspension of the rods 21 from the plates 24, as compared with a rigid connection between these parts, has the advantage that a much smaller vibrator is sufficient.

Due to the vibration, the adhering dust is very effectively removed from the wires. The dust is loosened in form of pieces. The coarser pieces, which constitute the by far predominant portion of the dust removed from the wires, drop to the bottom of chamber 7 where they are entrained by the screw 11 and are conveyed into the pipe 12 from which they are discharged. The conveyor screw 11 is preferably so operated that the collected dust, as shown in Figs. 1 and 2, always fills the trough 10 and extends upwardly above the lower edge of the partitions 14. This secures a good seal by the collected material against the passage of gas beneath the partitions.

The gas passing out of the filter device carries the residual finer particles of the separated dust and conveys them into the cyclone. Even the finest pieces of the depositions separated from the filter wires possess a very much larger grain size than the original individual dust particles and for that reason are virtually fully separated from the gas within the cyclone. In cases where such a degree of separation is not needed, the cyclone may also be substituted by a simple dust collecting chamber.

The intervals of time best suited for temporarily operating the individual vibrators can readily be ascertained by testing. The vibrators are preferably switched on and off by a correspondingly adjusted clock or timer.

Figure 8:
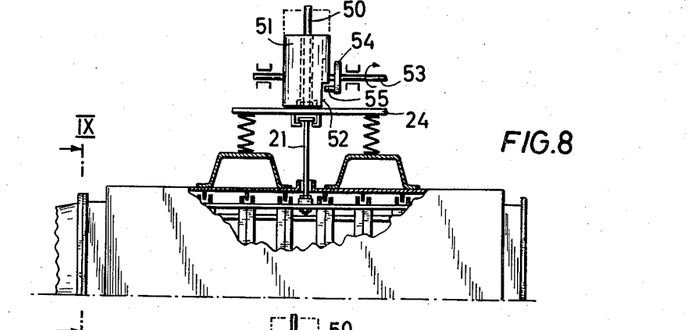
Fig. 8 shows a modified embodiment of a filter by a partial and part-sectional view.
Figures 9, 10:
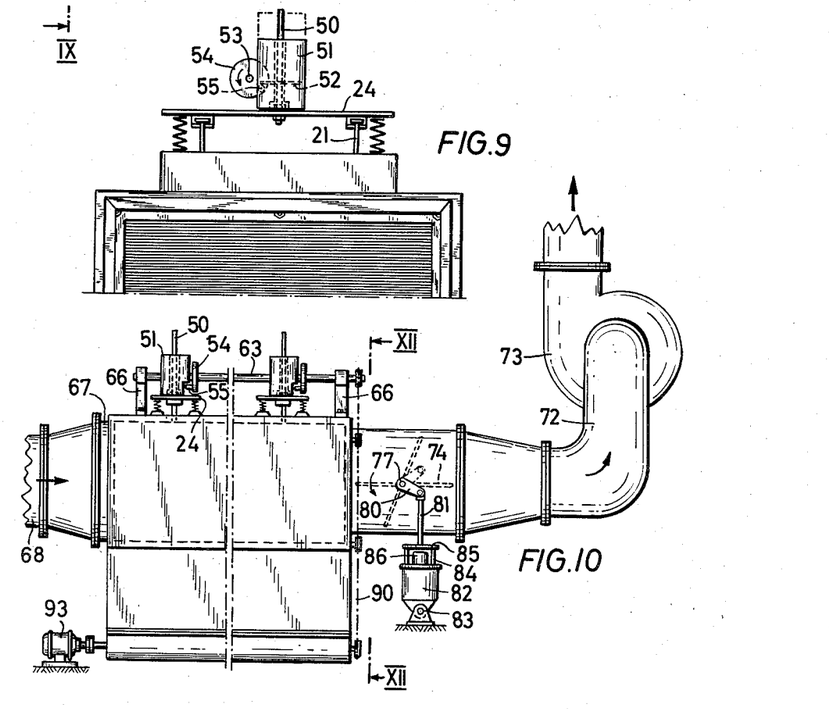
Fig. 9 is a cross-sectional view, the section being along the line IX—IX in Fig. 8.
Fig. 10 shows another complete filter plant in side view.

The filter illustrated in Figs. 8 and 9 differ from the one described above in that a striker mechanism is provided instead of a vibrator. Mounted on the plate 24 is a vertical guide rod 50. A weight 51 is slidably mounted on rod 50. The lower end of weight 51 has a recess 52. A shaft 53, extending horizontally, carries a disc 54 with a dog pin 55. The arrangement is such that the dog pin, when disc 54 is rotating, lifts the weight 51 into the position shown by dot-and-dash lines and then releases the weight so that it will drop back onto the plate 24. In this manner, the plate 24 is excited to rapidly decaying oscillations which are transmitted to the assembly of wire frames by means of the rods 21. As a result, the dust accumulations on the individual wires are loosened in the same manner as described above. When employing a striker mechanism, it is not absolutely necessary to suspend the wire frame assemblies from a spring-supported plate. The frame assembly may also be mounted stationarily within the channel and, for instance, may firmly rest upon the partitions 14. In this case, the plate against which the weight of the striker mechanism will strike, is rigidly connected with the assembly by suitable rods. The jarring which thus is imparted to the assembly and hence also to the individual wires by the dropping of the weight, has the effect that the accumulated dust will drop off the wires almost instantaneously.

Since the dust content of the gas is largest at the channel entrance, the wires in the planes first traversed by the gas accumulate the largest quantities of dust. The wires in the rearward planes therefore are still receptive for dust when the wires of the forward planes must already be cleaned. It is therefore advisable to give the wires in the forward planes a larger cross section, for instance, twice the cross section, than the wires in the rearward planes whose cross section, is chosen in dependence upon the grain size of the dust as explained in the foregoing. Since the thicker wires can accumulate more dust than thinner wires, care is taken in this manner to utilize the wires of all planes to an approximately uniform extent. That is, under such conditions all wires require approximately the same period of time to be so greatly charged with dust as to require cleaning. Furthermore, the coarser dust particles precipitate mainly upon the wires of the forward planes, whereas the majority of the finer particles settle upon the wires of the rearward planes. For that reason the arrangement of thicker wires in the forward planes and thinner wires in the rearward planes is also preferable in those cases where the gas to be processed carries dust particles of greatly differing grain size.

Figure 11:
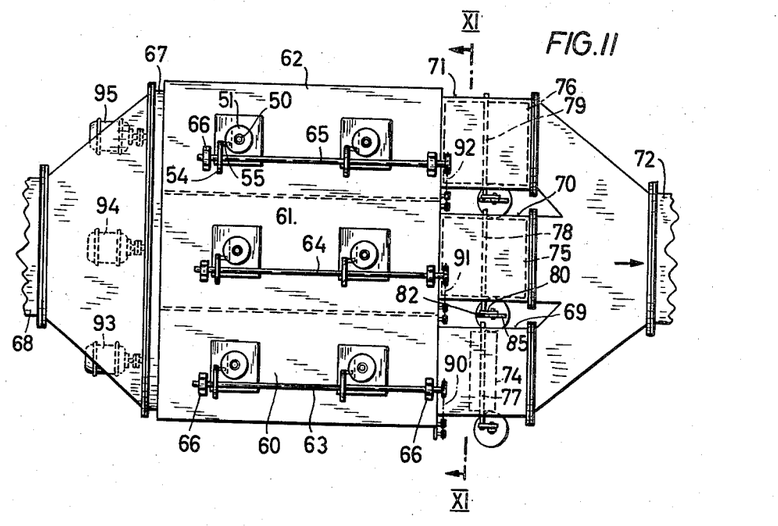
Fig. 11 is a plan view of the same plant.
Figure 12:
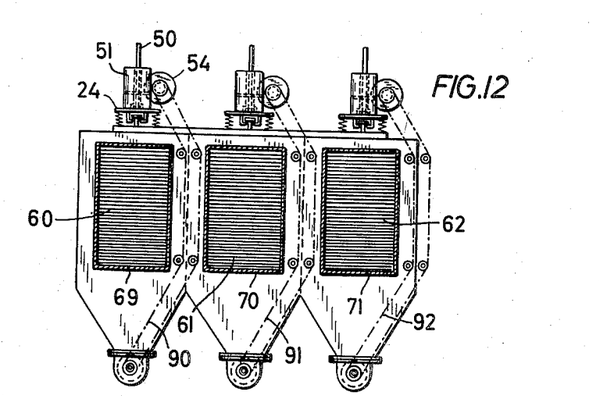
Fig. 12 is a cross section along the line XII—XII in Fig. 11.

The filter plant illustrated in Figs. 10 to 12 is provided with three filter units each comprising two subassemblies of filter wires as described in the foregoing. Each individual sub-assembly is equipped with a striker mechanism also as described above. The arrangement is such that the two discs 54 for lifting the weights 51 of each striker mechanism are seated on a common shaft 63, 64 or 65. The driving motion for the shaft is preferably taken by endless chains 90, 91, 92 from the discharging conveyor screws whch are each provided with a drive motor 93, 94 or 95. The three filter units have their respective left-hand ends joined with a common connecting flange 67 with which the inlet conduit 68 for the supply of the dust-laden gas is connected. At the respective right-hand ends the filter units have respective outlet ducts 69, 70 and 71 for the discharge of the clean gas. The outlet ducts communicate with a single outlet conduit 72 which communicates with the ambient air through a blower 73.

Mounted within the individual outlet ducts 69, 70 and 71 are the vanes 74, 75 and 76 of respective gate valves. The vanes are rigidly mounted on respective shafts 77, 78 and 79 rotatably journalled in the lateral walls of the outlet ducts. As is apparent from Fig. 11, each shaft protrudes at one side out of the conduit and carries on the protruding end a lever 80. Linked to the lever 80 is one end of a connecting rod 81 whose other end is attached to a lifting device.

The lifting device consists for instance of an oil-filled cylindrical housing 82 which has its bottom linked by a pivot 83 to the foundation of the filter plant. A piston displaceable within the housing 82 is provided with two piston rods 84 which pass through respective openings in the cover of housing 82 and are joined with rod 81 by a yoke 85. Located within the piston is a pump rotor (not shown) driven by an electric motor 86. When the motor 86 is in operation, the pump rotor displaces oil from above the piston through ducts to the cylinder space beneath the piston with the effect of rapidly lifting the piston as well as the piston rods 84. The lifting motion is transmitted by yoke 85 and connecting rod 81 to the valve lever 80 so that the lever is turned from the position shown in full lines (Fig. 10) to the position shown in dot-and-dash lines. As a result, the vane 74 is turned from the broken-line position to the dot-and-dash position in which it closes the duct. When the motor 86 is switched off, the piston drops and the vane 74 is turned back to the opening position. The vanes 75 and 76 are provided with a similar lifting device. The lifting devices are preferably switched on and off by means of a clock or timer so set that at any time only one of the vanes, for instance vane 74, is closed while the two other vanes 75 and 76 are open. The motors 93, 94 and 95 are connected to, and controlled by, the same timer so that at any time only the dust-discharging conveyor screw of the one filter is placed in operation whose gate valve is in the closing position.

During operation of the filter plant, therefore, each gate valve is closed for a given period of time, and the three valves are closed sequentially in a predetermined cycle. The same cyclical operation is effective with respect to the dust-discharge conveyor screws and, accordingly, only the striker mechanism of the one filter unit is placed in operation whose gate valve is in the closing position. Figs. 10 to 12 show the operating condition in which the gate valve 74 is closed and the valves 75 and 76 are open. After expiration of a given period of time, valve 74 is opened and valve 75 is closed simultaneously, and so forth. Under the action of blower 73, the dust-laden gas always passes through those filters whose gate valves are open, namely in the illustrated condition through the filter units 61 and 62.

Due to the above-described labyrinth seals, the gas is forced to flow through the gaps between the filter wires. With a sufficiently high velocity of the gas on its passage through the filter channels, the entrained dust precipitates onto the left-hand side of the wires as described above with reference to Fig. 5 and forms on the wires a deposition 46 within which the individual dust particles firmly adhere to one another. The gas thus cleaned, passes through the ducts 70 and 71 into the common outlet conduit 73 and thence through the blower 73.

As mentioned, Fig. 5 shows a condition in which the dust deposition 46 may commence to impair the separating operation. When this condition is reached, the valve 74 is opened and the valve 75 is closed simultaneously so that the dust-laden gas now traverses the filter units 60 and 62. Simultaneously with the closing of valve 75 the dust discharge conveyor as well as the striker mechanisms of the filter unit 61 are put in operation. Due to the jarring of the wires by the striker mechanisms, the dust depositions are released and collect in the bottom chamber of the filter units from which they are removed by means of the conveyor screw. If the individual filter units are provided with vibrators instead of striker mechanisms, the vibrators are preferably likewise connected to a timer to be automatically controlled thereby. The timer is so set that it operates only the vibrator of the one filter then closed by its valve, such operation of the vibrator being temporary and lasting but a short interval of time. In all other respects, the dust separating and discharging operation in devices provided with vibrators instead of striker mechanisms takes place in the same manner as described above. As mentioned, the proper intervals of time between the active and inactive periods of the individual filter units are best determined by tests.

It is not always necessary to provide three generally parallel arranged filter units for cyclical operation in the above-described manner. In some cases, two filter units arranged beside each other are sufficient while in other cases more than three filter units are preferable. When providing two filter units, one or the other filter is alternately supplied with the dust-laden gas. Consequently each of the two filter units must be dimensioned for taking care of the entire gas quantity to be cleaned. When using three filters as described above, the total gas quantity at any time is distributed upon two filter units so that each unit need be dimensioned for the passage of only one-half of the total gas quantity. It will be recognized that the total cross-section of the filter units is smaller with an increased number of filters. On the other hand, the number of filter units is limited by the fact that an excessive number may render the plant too complicated.

The invention is particularly suitable for the dust removal from waste gases issuing from a heating device for cement raw material of the kind in which the cement raw material is entrained by the hot exit gases of a rotary cement kiln. The gases coming from such a cement heating device are first passed through a centrifugal dust separator so that the major portion of the dust is removed. The gases issuing from the centrifugal dust separator have a relatively high temperature and for that reason can be liberated from the residual dust advantageously in a filter device according to the invention.

It will be apparent to those skilled in the art, upon a study of this disclosure, that my invention permits of various modifications and may be embodied in apparatus other than those specifically illustrated and described herein, without departing from the essential features of my invention and within the scope of the claims annexed hereto.

I claim:

1. A mechanical filter for separating dust from gas, comprising a plurality of filter units each having a substantially horizontal channel providing an inlet duct for dust-laden gas and an outlet duct for cleaned gas; each of said filter units comprising a multiplicity of frames of filter wires, each frame having parallel and mutually spaced wires distributed over the cross section of said channel in a substantially vertical plane, said respective frames being spaced from each other between said inlet and outlet ducts, the wires in each frame being freely spaced from each other, the said mutual spacing between the wires within a plane being substantially equal to one to three times the diameter of the wires, the spacing between adjacent planes being a multiple of the wire diameter, means firmly connecting the frames of each filter unit into a unitary structure, a mechanism operatively connected with said unitary structure for shaking loose dust deposits from said wires, a chamber for collecting the loosened dust deposits and having a bottom outlet for discharging the collected deposits, and insert structures mounted in said chamber and forming relative to the gas flow a greater impedance than said frames of filter wires; a gas inlet conduit common to said plurality of filter units and in communication with all of said respective inlet ducts; and each of said units having gate valve means for temporarily taking the unit out of the gas path in order to operate said mechanisms and discharge said deposits.

2. A filter according to claim 1, comprising a common clean-gas outlet conduit in communication with said respective outlet ducts of said plurality of filter units, said gate valve means in each unit having a valve vane mounted in said clean-gas outlet duct.

3. A filter according to claim 1, comprising a plurality of drives connected with said respective gate valve means, said drives being cyclically operable and only one of said respective gate valve means being in open position at a time.

4. In a filter according to claim 3, said drives being connected with said respective jarring mechanisms, and only the one jarring mechanism of the one filter whose valve means are closed being in active condition at a time.

5. A mechanical filter for separating dust from gas, particularly hot gas, comprising a housing structure forming a substantially horizontal channel and having at one channel end an inlet for dust-laden gas and at the opposite end an outlet for cleaned gas, a multiplicity of frames of filter wires, each frame having parallel and mutually spaced wires distributed over the cross section of said channel in a substantially vertical plane, said respective frames being spaced from each other between said inlet and outlet, the wires in each frame being freely spaced from each other, the spacing between the wires within a plane being substantially equal to one to three times the diameter of the wires, the spacing between adjacent planes being a multiple of the wire diameter, means firmly connecting the frames together to form a unitary structure, a mechanism operatively connected with said unitary structure for shaking loose dust deposits from said wires, said housing structure having beneath said arrays a downwardly tapering chamber for collecting the loosened dust deposits and having a bottom outlet for discharging the collected deposits, and insert structures mounted in said chamber and forming relative to the gas flow a greater impedance than said frames of filter wires.

6. A mechanical filter for separating dust from gas, comprising a housing structure forming a substantially horizontal channel and having at one channel end an inlet for dust-laden gas and at the opposite end an outlet for cleaned gas, a multiplicity of frames of filter wires, the wires having a diameter between 0.5 and 20 mm., each frame having parallel and mutually spaced wires distributed over the cross section of said channel in a substantially vertical plane, said respective frames being horizontally spaced from each other between said inlet and outlet, the wires in each frame being freely spaced from each other, the spacing between the wires within a plane being substantially equal to one to three times the diameter of the wires, the spacing between adjacent planes being a multiple of the wire diameter, means firmly connecting the frames together to form a unitary structure, a mechanism connected with said unitary structure for shaking loose dust deposits from said wires, said housing structure having beneath said frames a chamber for collecting the loosened dust deposits and having a bottom outlet for discharging the collected deposits, and a multiplicity of partitions extending in said respective planes from said frames downwardly to near the bottom of said chamber and dividing said chamber into horizontally aligned compartments.

7. A mechanical filter for separating dust from gas, comprising a housing structure forming a substantially horizontal longitudinal channel and having at one channel end an inlet for dust-laden gas and at the opposite channel end an outlet for cleaned gas, a multiplicity of frames of filter wires, each frame having parallel and mutually spaced wires distributed over the cross section of said channel in a substantially vertical plane, said respective frames being longitudinally spaced from each other between said inlet and outlet, the wires in each frame being freely spaced from each other, the spacing between the wires within a plane being substantially equal to one to three times the diameter of the wires, the spacing between adjacent planes being a multiple of the wire diameter, means firmly connecting the frames together to form a unitary structure, a mechanism connected with said unitary structure for shaking loose dust deposits from said wires, said housing structure having beneath said arrays a chamber for collecting the loosened dust deposits, said chamber having in said planes a downwardly tapering shape and having a trough-shaped bottom and a dust outlet in said bottom, a longitudinal conveyor device disposed in the trough space of said bottom for delivering the collected deposits to said dust outlet, and a multiplicity of partitions extending in said respective planes from closely adjacent the frames downwardly to near the top of said conveyor device and dividing said chamber longitudinally into compartments.

8. In a filter according to claim 6, said unitary structure having slight clearance relative to said housing structure and relative to said partitions to be capable of vibratory motion, and said mechanism having a vibrator mounted outside said conduit structure and connected with said unitary structure to impart vibrations thereto when said vibrator is excited, at at least about 6000 oscillations per minute.

9. In a filter according to claim 6, said unitary structure having a slight clearance relative to said housing structure and relative to said partitions to be capable of vibratory motion, said mechanism being mounted exteriorly on top of said housing structure and having connecting means extending downwardly into said housing structure, and said unitary structure being suspended from said connecting means.

10. In a filter according to claim 6, said unitary structure having a slight clearance relative to said housing structure and relative to said partitions to be capable of vibratory motion, a base plate, springs resiliently supporting said plate on top of said housing structure, said mechanism being mounted on said plate and having rod connecting means extending downwardly into said housing structure, said unitary structure being suspended by said rod, the rod being loosely suspended from the plate, the vibrating mechanism having an oscillation frequency of at least several thousand oscillations per minute.

11. In a filter according to claim 6, said mechanism having a rigid member connected with said frames and having a striker upwardly displaceable from said member, and means for actuating said striker to impart shock to said member and said frames.

12. A mechanical filter for separating dust from gas, comprising a housing structure forming a substantially horizontal longitudinal channel and having at one channel end an inlet for dust-laden gas and at the opposite channel end an outlet for cleaned gas, a multiplicity of frames of free filter wires, each frame having parallel and mutually freely spaced wires distributed over the cross section of said channel in a substantially vertical plane, said respective planes being longitudinally spaced from each other between said inlet and outlet, the spacing between the wires within a plane being substantially equal to one to three times the diameter of the wires, the spacing between adjacent planes being a multiple of the wire diameter, means firmly connecting the frames together to form a unitary structure, the wires having a diameter between 0.5 and 20 mm., the diameter of the wires in the planes located upstream being larger than in the planes located downstream, a mechanism connected with said unitary structure for shaking loose dust deposits from said wires, said housing structure having beneath said frames a chamber for collecting the loosened dust deposits, said chamber having a downwardly tapering shape and having a trough-shaped bottom and a dust outlet in said bottom, a longitudinal conveyor device disposed in the trough space of said bottom for delivering the collected deposits to said dust outlet, and a multiplicity of partitions extending, in respective planes, from closely adjacent the frames downwardly to near the top of said conveyor device and dividing said chamber longitudinally into compartments.

13. A mechanical filter for separating dust from gas, comprising a housing structure forming a substantially horizontal longitudinal channel and having at one channel end an inlet for dust-laden gas and at the opposite end an outlet for cleaned gas, a multiplicity of arrays of filter wires, each array comprising parallel and mutually spaced straight wires distributed over the cross section of said channel in a substantially vertical plane, said respective planes being horizontally spaced from each other between said inlet and outlet, the wires in each plane being spaced transversely from and unattached to the other wires of that plane, and being spaced longitudinally from and unattached to wires of the other planes, the spacing between the wires within each plane being substantially one to three times the diameter of the wires of that plane, the spacing between adjacent planes being a multiple of the wire diameter, means connected with said arrays for shaking loose dust depositis from said wires, said housing structure having beneath said arrays a downwardly tapering chamber for collecting the loosened dust deposits and having a bottom outlet for discharging the collected deposits, and a multiplicity of partitions extending in said respective planes from said arrays downwardly to near the bottom of said chamber and dividing said chamber into horizontally aligned compartments.

14. A mechanical filter for separating dust from gas, comprising a housing structure forming a substantially horizontal longitudinal channel and having at one channel end an inlet for dust-laden gas and at the opposite end an outlet for cleaned gas, a multiplicity of arrays of filter wires, each array comprising parallel and mutually spaced wires distributed over the cross section of said channel in a substantially vertical plane, said respective planes being horizontally spaced from each other between said inlet and outlet, the wires in each plane being spaced transversely from and unattached to the other wires of that plane, and being spaced longitudinally from and unattached to wires of the other planes, the spacing between the wires within each plane being substantially one to three times the diameter of the wires of that plane, the spacing between adjacent planes being a multiple of the wire diameter, the diameters of the wires in the planes located upstream being larger than in the planes located downwstream, a mechanism connected with said arrays for shaking loose dust deposits from said wires, said housing structure having beneath said arrays a chamber for collecting the loosened dust deposits and having a bottom outlet for discharging the collected deposits, and a multiplicity of partitions extending in said respective planes from said arrays downwardly to near the bottom of said chamber and dividing said chamber into horizontally aligned compartments.

15. A mechanical filter for separating dust from gas, comprising a housing structure forming a substantially horizontal longitudinal channel and having at one channel end an inlet for dust-laden gas and at the opposite end an outlet for cleaned gas, at least ten arrays of filter wires, each array comprising parallel and mutually spaced straight wires distributed over the cross section of said channel in a substantially vertical plane, said respective planes being horizontally spaced from each other between said inlet and outlet, the wires in each plane being spaced transversely from and unattached to the other wires of that plane, and being spaced longitudinally from and unattached to wires of the other planes, the spacing between the wires within each plane being substantially one to three times the diameter of the wires of that plane, the spacing between adjacent planes being a multiple of the wire diameter, the diameters of the wires in the entrance plane being approximately twice as large as the diameter of the wires in the exit plane, means for shaking loose dust deposits from said wires, said housing structure having beneath said arrays a chamber for collecting the loosened dust deposits and having a bottom outlet for discharging the collected deposits, and a multiplicity of partitions extending in said respective planes from said arrays downwardly to near the bottom of said chamber and dividing said chamber into horizontally aligned compartments.

16. The apparatus defined in claim 7, the housing structure containing at least two of said unitary structures of frames, each containing at least ten frames, the diameter of the wires in the planes located upstream being larger than in the planes downstream, the wires having a diameter between 0.5 and 20 mm.

17. A filter system comprising the apparatus defined in claim 16, and a cyclone separator communicating with the gas outlet of said apparatus.

18. The apparatus defined in claim 12, the wires being disposed substantially horizontally.

References Cited in the file of this patent

UNITED STATES PATENTS

| | | |
|---|---|---|
| 2,078,558 | Borell | Apr. 27, 1937 |
| 2,477,623 | Kling | Aug. 2, 1949 |
| 2,722,995 | King | Nov. 8, 1955 |

FOREIGN PATENTS

| | | |
|---|---|---|
| 10,029 | Great Britain | Apr. 25, 1911 |
| 402,075 | Great Britain | Nov. 22, 1933 |